No. 622,756. Patented Apr. 11, 1899.
K. D. CAMP.
AUTOMATIC REGISTER.
(Application filed Feb. 18, 1897.)
(No Model.)
Fig. 1.
Fig. 3.
Fig. 2.
Fig. 4.
Fig. 5.
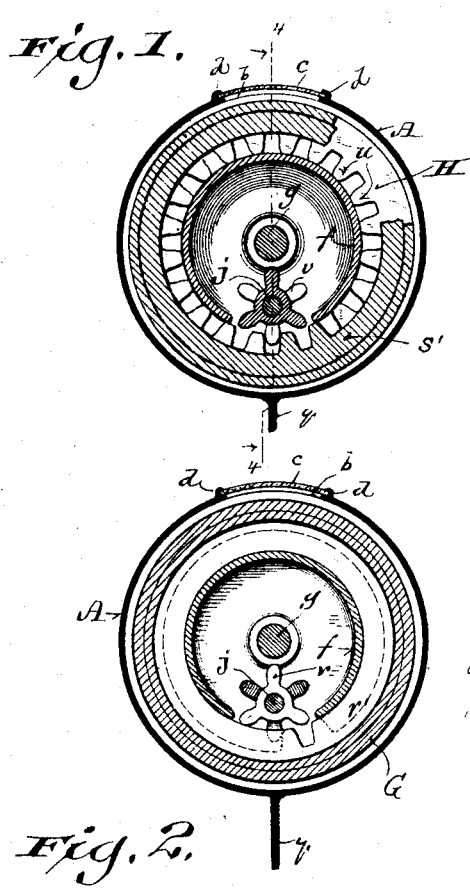
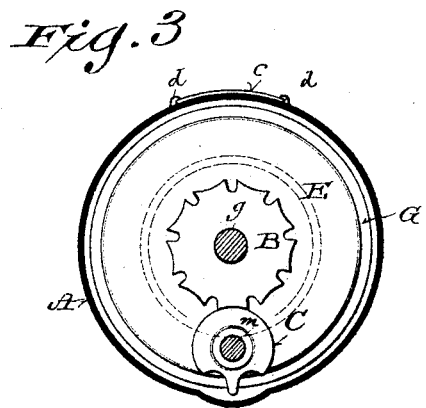
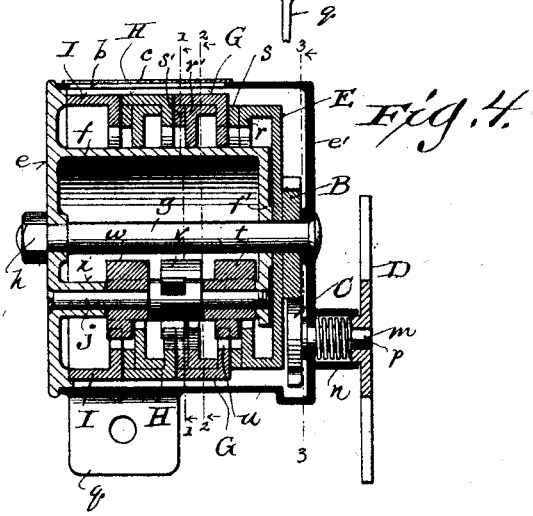
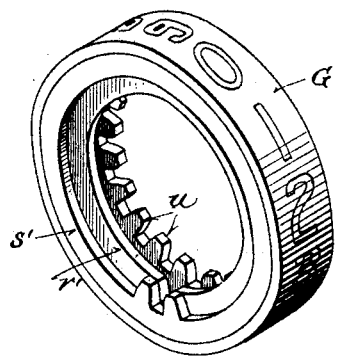
Witnesses:
Geo W Young
N. E. Oliphant
Inventor:
Key D. Camp
By H. G. Underwood
Attorneys

UNITED STATES PATENT OFFICE.

KEY D. CAMP, OF MUKWONAGO, WISCONSIN, ASSIGNOR OF TWO-THIRDS TO REBECCA A. CRAIG, OF SAME PLACE, AND GEORGE H. WILBUR, OF WAUKESHA, WISCONSIN.

AUTOMATIC REGISTER.

SPECIFICATION forming part of Letters Patent No. 622,756, dated April 11, 1899.

Application filed February 18, 1897. Serial No. 623,939. (No model.)

*To all whom it may concern:*

Be it known that I, KEY D. CAMP, a citizen of the United States, and a resident of Mukwonago, in the county of Waukesha and State of Wisconsin, have invented certain new and useful Improvements in Automatic Registers; and I do hereby declare that the following is a full, clear, and exact description thereof.

My invention has for its object to provide simple, economical, light, and accurate registers of that class especially designed for use in connection with bicycles to automatically register mileage, but which may be utilized as counters in connection with various machines and apparatus.

Therefore the said invention consists in certain peculiarities of construction and combination of parts hereinafter set forth with reference to the accompanying drawings and subsequently claimed.

Figures 1, 2, and 3 of the drawings represent transverse sections, respectively indicated by the lines 1 1, 2 2, and 3 3 in the next succeeding figure; Fig. 4, a longitudinal section of the register, this view being indicated by line 4 4 in the first figure; and Fig. 5, a perspective view of one of a series of shells constituting parts of said register.

Referring by letter to the drawings, A represents a cylindrical casing having a preferably glazed aperture *b* in the form of a longitudinal slot, the glazing herein shown being a strip *c* of mica engaging guides *d* on the exterior of the casing parallel to the slot therein. One of the casing-heads *e* is preferably detachable and has a concentric longitudinally-slotted drum *f* extended from its inner side, this head and the one *e'* opposite thereto being connected by a headed arbor *g* and a nut *h*, run on the outwardly-projecting end of the same against the former head.

Extending through casing-head *e* and a boss *i* upon its inner side is a spindle *j*, made fast in drum-head *f'*, and loose on this spindle is a series of mutilated pinions that extend through the drum-slot to coöperate with a corresponding series of annular shells that are supported by drum *f* and have rotation around the same.

Loose on arbor *g*, adjacent to casing-head *e'*, is a wheel B, having peripheral notches at regular intervals, nine of these notches being herein shown. A single-tooth drive-wheel C coöperates with the notched wheel B, and an arbor *m*, fast to the drive-wheel, has its bearing in casing-head *e'*, the latter being shown provided with a hollow outwardly-extending housing *n* for a spiral spring *p*, surrounding the drive-wheel arbor under compression between said cylinder-head and a star-wheel D, this star-wheel being rigidly connected to said arbor in position to receive impulses of a button made fast to a rotary device—such, for instance, as a bicycle-wheel—and the casing is shown as provided with an exterior depending web *q* for attachment to a support.

The aforesaid spiral spring operates to retard motion of the star-wheel and to prevent the latter from having independent movement incidental to vibration.

In rigid connection with the notched wheel B or made part of the same is an annular shell E, centered by arbor *g* and provided with an inturned flange constituting an annulus *r*, having a single notch therein that registers with the interval between two teeth extending inward from a ring *s*, that constitutes part of said shell whether made integral therewith or fastened thereto, the latter construction being the one herein shown.

The register being herein shown organized as a bicycle-cyclometer, the above-described shell has one full rotation to nine of the drive-wheel C, that operates the notched wheel B, rotative with said shell, and at the ninth rotation of said drive-wheel the notched annulus and toothed ring of said shell will operate in conjunction with a mutilated pinion *t* to cause partial rotation of the same, this pinion being one of those that are loose on spindle *j*, heretofore set forth. Each pinion in the series has one-half of its full number of teeth less in width than those of the remaining teeth with which they alternate.

All the teeth of pinion *t* mesh with a continuous inwardly-extending cog-tooth flange *u* of another annular shell G, this flange being in bearing contact with the stationary drum *f*, that extends inward from head *e*, pertaining to the cylindrical casing. Integral with shell G or made fast thereto are shown an interior single-notch annulus $r'$ and a two-tooth ring $s'$, the notch and teeth being in like arrangement to those set forth in connection with the shell E, to which motion is imparted from the drive-wheel.

A ring-tooth of the first shell E striking a narrow tooth of the pinion $t$ causes the next succeeding wide tooth of said pinion to engage the annulus-notch of said shell, and both of these pinion-teeth being in mesh with the cog-tooth flange $u$ of the succeeding shell G the latter will have one-tenth of a revolution imparted thereto by the motion thus transferred from the former shell.

In the assemblage of parts herein shown and described the shell G is the units-counter for miles, its periphery being provided with figures of the Arabic notation at regular intervals; but in some organizations of the register it may be preferable to have shell E serve as the units-counter, and in such an instance shell G would be the tens-counter.

Shell G, with its single-notch annulus $r'$ and two-tooth ring $s'$, operates in conjunction with a mutilated pinion $v$ of the series on spindle $j$, and by the latter pinion intermittent motion is imparted to another shell H, that has rotation on drum $f$, this latter shell being similar in all respects to the one G aforesaid and having one-tenth of one revolution to each full revolution of the same.

The shell H operates in conjunction with another mutilated pinion $w$ of the series on spindle $j$, and this latter pinion is in mesh with the continuous inwardly-extending cog-tooth flange of another shell I, also rotative around the drum $f$ in proportion of one to ten of the preceding shell. The shell I being the last of the series loose on the drum, it is made without an annulus and ring such as have been described in connection with the preceding shells; but is to be understood that the number of shells and their coacting parts herein described may be multiplied indefinitely, and all of the shells on said drum are peripherally indexed to indicate values from naught to nine, inclusive, similar to the showing made in Fig. 5.

From the foregoing it will be understood that registration is had in the ascending order of units, tens, &c., and this registration is apparent through the aperture in the cylindrical casing.

The single-notch annulus and two-tooth ring herein described in connection with each of a majority of the shells constitute what is practically a compound flange, and it may be found that no more of this flange need be employed than is necessary for providing the notch and teeth necessary to effect an engagement with the wide teeth of a mutilated pinion by which to transfer motion to the next succeeding shell having a continuous inwardly-extending cog-tooth flange in mesh with all the teeth of said pinion.

Having thus described my invention, what I claim as new, and desire to secure by Letters Patent, is—

1. A register of the class described comprising an annular index-shell arranged and geared to have intermittent rotary motion imparted thereto from a driver and provided with an inwardly-extending annular flange having a pair of teeth thereon and a single notch in register with the interval between the teeth, a stationary longitudinally-slotted drum, a series of index-shells each provided with an inner circle of cog-teeth in loose bearing contact with the drum and all but the last shell of said series provided with a toothed and notched flange similar to that of the primary shell; a spindle fast in the shell-supporting drum, and a series of pinions loosely arranged on the spindle to extend outside the drum-slot, each pinion having alternate wide and narrow teeth all of which mesh with the circle of cog-teeth pertaining to a shell, the wide teeth only being engageable with the toothed and notched flange of a preceding shell.

2. A register of the class described comprising a longitudinally-apertured cylindrical casing having a head thereof provided with a concentric inwardly-extended and longitudinally-slotted drum, a central arbor, an annular index-shell loose on the arbor, a wheel in rigid connection with the shell but also loose on said arbor and provided with nine peripheral notches, a single-tooth drive-wheel operative in conjunction with the nine-tooth wheel, an annular flange extending inward from said shell and having a pair of teeth thereon as well as a notch in register with the interval between the teeth, a series of index-shells each provided with an inner circle of cog-teeth in loose bearing contact with the drum and all but the last shell of said series provided with a toothed and notched flange similar to that of the primary shell; a spindle fast in said drum, and a series of pinions loosely arranged on the spindle to extend outside the drum-slot, each pinion having alternate wide and narrow teeth all of which mesh with the circle of cog-teeth pertaining to a shell, the wide teeth only being engageable with the toothed and notched flange of a preceding shell.

In testimony that I claim the foregoing I have hereunto set my hand, at Burlington, in the county of Racine and State of Wisconsin, in the presence of two witnesses.

KEY D. CAMP.

Witnesses:
C. H. EDGERTON,
H. J. BUDD.